No. 874,485. PATENTED DEC. 24, 1907.
A. F. BROWN.
DISK BEARING.
APPLICATION FILED JAN. 30, 1907.
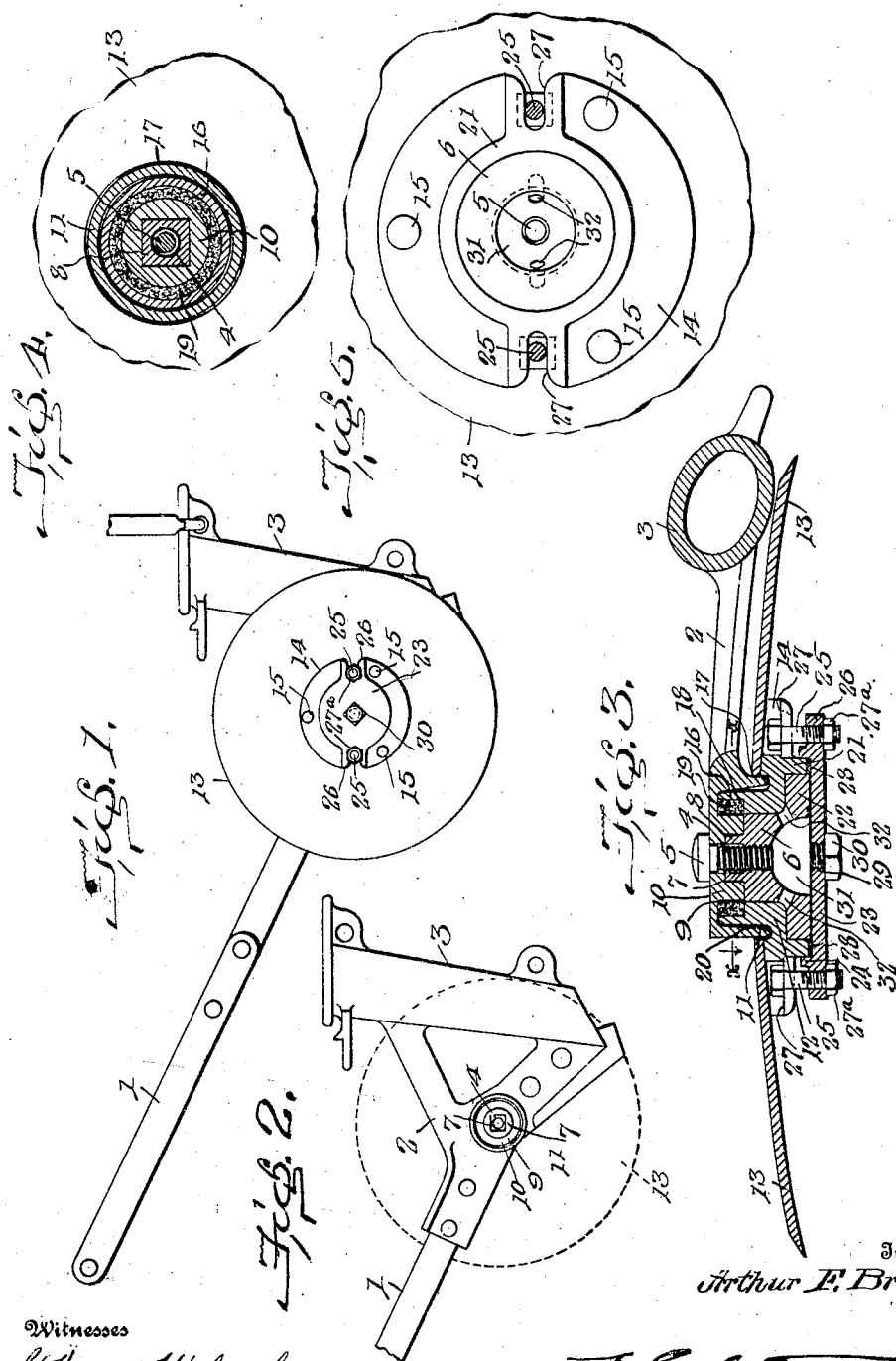
Witnesses
G. Howard Walmsley,
Edward L. Reed
Inventor
Arthur F. Brown,
By H. A. Toulmin,
Attorney

UNITED STATES PATENT OFFICE.

ARTHUR F. BROWN, OF SPRINGFIELD, OHIO, ASSIGNOR TO P. P. MAST AND COMPANY, OF SPRINGFIELD, OHIO, A CORPORATION OF OHIO.

DISK-BEARING.

No. 874,485.　　Specification of Letters Patent.　　Patented Dec. 24, 1907.

Application filed January 30, 1907. Serial No. 354,837.

*To all whom it may concern:*

Be it known that I, ARTHUR F. BROWN, a citizen of the United States, residing at Springfield, in the county of Clark and State of Ohio, have invented certain new and useful Improvements in Disk-Bearings, of which the following is a specification, reference being had therein to the accompanying drawings.

The present invention relates to disk bearings such as are employed in disks used in connection with agricultural implements, such as disk furrow openers for grain drills and the like.

The object of the invention is to produce a bearing of this character which will be absolutely dust-proof and will be self lubricating, thereby providing a smooth easy running bearing and greatly extending the life of the same.

A further object is to produce such a bearing of as simple a construction as is possible, thereby reducing the cost and avoiding an unwieldy or overweighted disk.

With these objects in view the present invention consists of certain novel features of construction hereinafter to be described, and then more particularly pointed out in the claims.

In the accompanying drawings, Figure 1 is a side elevation of a portion of a grain drill embodying my invention; Fig. 2 is a similar view of the same, with the disk removed, Fig. 3 is a horizontal sectional view, taken centrally through the disk of Fig. 1; Fig. 4 is a vertical sectional view taken on the line *x x* of Fig. 3; and Fig. 5 is a side elevation of the hub and bearing block, with the cap removed.

In these drawings I have shown a portion of a disk grain drill and have embodied in the same one form of my invention.

The reference numeral 1 indicates the usual drag bar provided with a supporting bracket 2, upon which is mounted the usual grain conduit or boot 3. The support 2 is provided with an aperture 4 adapted to receive a screw-threaded bolt 5, the inner end of which is adapted to engage a threaded aperture in a bearing block 6 and to rigidly secure the same to the support 2. The support 2 is provided with an angular recess 7 surrounding the aperture 4 which is adapted to receive the squared lug 8 on the outer end of the bearing block 6 to prevent the same from turning relatively to the support. The support is further provided with an annular recess 9 surrounding the aperture 4 and separated from the same by a projection or flange 10 and has its outer wall extended inwardly, as shown at 11, to form an annular flange.

The hub 12 is rigidly secured to the disk 13 and comprises a plate 14 secured to the disk 13 by means of suitable rivets or bolts 15 and provided with an inwardly extending sleeve 16 adapted to extend through an aperture 17 formed in the disk 13 and to have its inner end seated in the annular recess 9 in the support 2. That portion of the sleeve 16 which enters the recess 9 is preferably rabbeted or cut away, as shown at 18, to form a recess to receive a packing 19, of felt or other suitable material, which extends over the joint formed between the bearing sleeve 16 and the bearing block 6 to prevent the entrance of dust or foreign material. The bearing sleeve 16, which extends through the aperture 17 in the disk, is of less diameter than said disk and thereby provides an annular recess or groove 20 between the inner edge of the disk and said bearing sleeve, said annular groove being adapted to receive the inner end of the flange 11 surrounding the annular recess 9 on the support 2, thus rendering it practically impossible for dust or foreign material to enter the recess in the support. The bearing plate 14 is further provided with an outwardly extending annular flange 21 having its inner wall adapted to form a bearing surface to coöperate with the bearing surface formed by the periphery of the enlarged head 22 of the bearing block 6.

A cap 23 having an inwardly extending flange 24 fits over the annular flange 21 and is rigidly secured thereto by means of bolts 25, extending through apertured lugs 26 formed on the cap. The heads of said bolts are secured to the plate 14, preferably by inserting the same in T-shaped slots 27 and the outer ends of the same are provided with suitable nuts 27ª. A suitable packing 28 is inserted between the outer edge of the flange 21 and the cap 23 to render the same more completely dust-proof. The cap 23 is provided with a central screw-threaded aperture 29 which is normally closed by a screw-threaded plug 30 and is adapted to receive the discharge nozzle of a charging cup for filling the oil receptacle 31 formed in the bearing block 6 with an oil or lubricant. This oil receptacle 31 is directly connected with the bearing surfaces by the oil ducts or apertures 32, preferably leading to the angle of the bearing, thereby feeding the lubricant directly to all parts of the bearing surface and uniformly lubricating the same.

From the foregoing description it will be obvious that the bearing therein described is practically dust-proof, there being but two possible ways in which dust could gain access to the bearing, and both of these ways being guarded by overlapping flanges and suitable packings, the entrance of foreign matter is rendered practically impossible. It will be further observed that the disk and its bearing is readily detached from the support 2 by removing the screw 5 and that by the loosening of the nuts 27ª on the bolts 25 the cap 23 may be removed to give access to the interior of the bearing; and it will be further observed that the bearing is provided with means for thoroughly lubricating all parts of the bearing surfaces by feeding the lubricant directly thereto from the receptacle formed in the bearing block as distinguished from the old method in which the oil was obliged to pass around the flange of the bearing block and thus work its way to the different parts of the bearing, a method which usually resulted in an overlubrication of the parts adjacent to the oil receptacle and in allowing those parts remote from said receptacle to run dry. It will also be noticed that the packing 19 in the rabbeted portion 18 of the sleeve 16 of the hub extends over the joint between the sleeve 16 and the bearing block 6 and is provided with a horizontal support to retain it in the proper position and to prevent its disarrangement by the loose movement of the hub relatively to the support, so that it at all times occupies such a position as to prevent dirt from entering the bearing as distinguished from the old form in which the packing was supported between vertical surfaces and the movement of these surfaces relatively one to the other disarranged the packing and permitted dirt to enter the bearing.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a disk bearing, the combination, with a disk having a central aperture, a support for said disk having a recess therein, and a bearing block rigidly secured to said support, of a hub rigidly secured to said disk and having a sleeve portion adapted to extend through the aperture in said disk into the recess in said support and having that portion within the recess rabbeted to form a seat and a packing mounted in said seat and closing the joint between said hub and said bearing block, substantially as described.

2. In a disk bearing, the combination, with a disk having a central aperture, a support for said disk, a bearing block rigidly secured to said support, and an annular flange carried by said support and surrounding the end of said bearing block, of a hub rigidly secured to said disk and having a sleeve portion adapted to extend through the aperture in said disk and to enter the space between said bearing block and said annular flange and having an annular recess in the inner wall thereof, said sleeve portion being of less diameter than the aperture in said disk, thereby forming an annular recess adapted to receive the end of said annular flange and a packing mounted in said recess between said sleeve and said bearing block, substantially as described.

3. In a disk bearing, the combination, with a disk having a central aperture, a support having an annular recess therein, the outer wall of said recess being extended to form a flange, and a bearing block rigidly and detachably secured to said support, of a hub rigidly secured to said disk and having a sleeve portion adapted to extend through said aperture into the recess in said support, an' annular recess in the inner end of said sleeve portion and a packing within said recess, said sleeve portion being of less diameter than the aperture in said disk, thereby forming an annular recess adapted to receive the end of said flange, substantially as described.

4. In a disk bearing, the combination, with a disk having a central aperture, a bearing hub rigidly secured to said disk and extending through said aperture, of a support for said disk having an annular recess therein adapted to receive the end of said hub and having an aperture within said annular recess, an angular recess in the inner wall thereof and surrounding said aperture, a bearing block fitting within said hub and having a screw-threaded aperture therein, an angular boss on said bearing block adapted to enter the angular recess of said support, and a screw-threaded bolt adapted to extend through the aperture in said support and engage the screw-threaded aperture in said bearing block, substantially as described.

5. A disk bearing comprising a support having a recess therein, a disk having an aperture, a hub rigidly secured to said disk, having a slot therein and having a portion extending through said aperture into the recess in said support, an outwardly extending flange carried by said hub, a bearing block fitting within said hub and said flange and rigidly secured to said support, of a cap provided with a bolt hole and having an inwardly extending flange adapted to fit over the flange on said hub, a headed bolt adapted to engage the slot in said hub and extend through the bolt hole in said cap and provided with a nut on its outer end.

6. In a disk bearing, the combination, with a support having a recess therein, a disk having an aperture, a hub rigidly secured to said disk having a portion extending through said aperture and engaging the recess in said support, of a bearing block adapted to fit within said hub and having a cup-shaped recess in the outer end thereof forming a lubricant receptacle, ducts leading from said recess to the bearing surfaces, and a cap adapted to be secured over the end of said hub to form a closure for said recess, and having an inlet aperture therein and means for closing said aperture.

7. In a disk bearing, the combination, with a support, a disk having an aperture, a hub rigidly secured to said disk having a portion extending through said aperture, lateral and longitudinal bearing surfaces formed within said hub, of a bearing block rigidly secured to said support and having lateral and longitudinal bearing surfaces adapted to coöperate with the bearing surfaces of said hub, an oil receptacle in the outer end of said bearing block, and oil ducts leading to the point of intersection of said longitudinal and lateral bearing surfaces, substantially as described.

8. In a disk bearing, the combination, with a support having an annular recess therein, a bearing block rigidly secured to said support, and a disk, of a hub carried by said disk and having one end adapted to enter said recess, the said end of the hub having its inner wall rabbeted and a packing supported between said wall and said support, substantially as described.

In testimony whereof, I affix my signature in presence of two witnesses.

ARTHUR F. BROWN.

Witnesses:
  E. O. HAGAN,
  EDWARD L. REED.